April 11, 1950 S. CRUM 2,504,002
STOKER TIMER
Filed Sept. 27, 1943 5 Sheets-Sheet 1
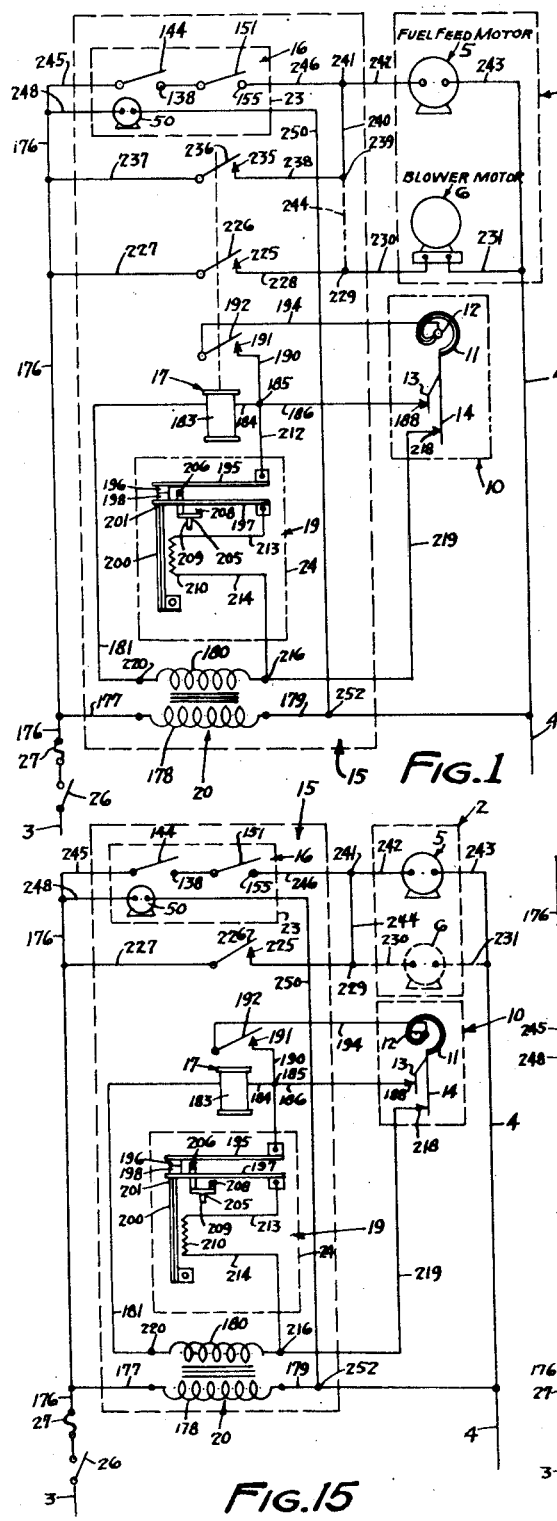
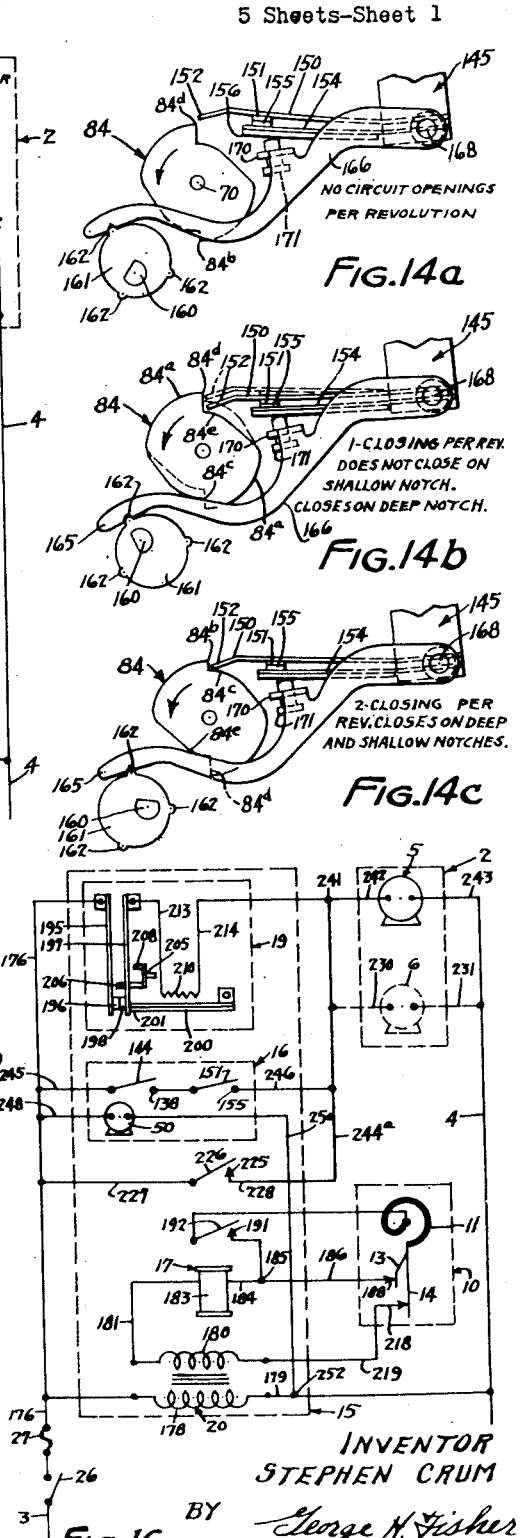
INVENTOR
STEPHEN CRUM
BY George N. Fisher
ATTORNEY

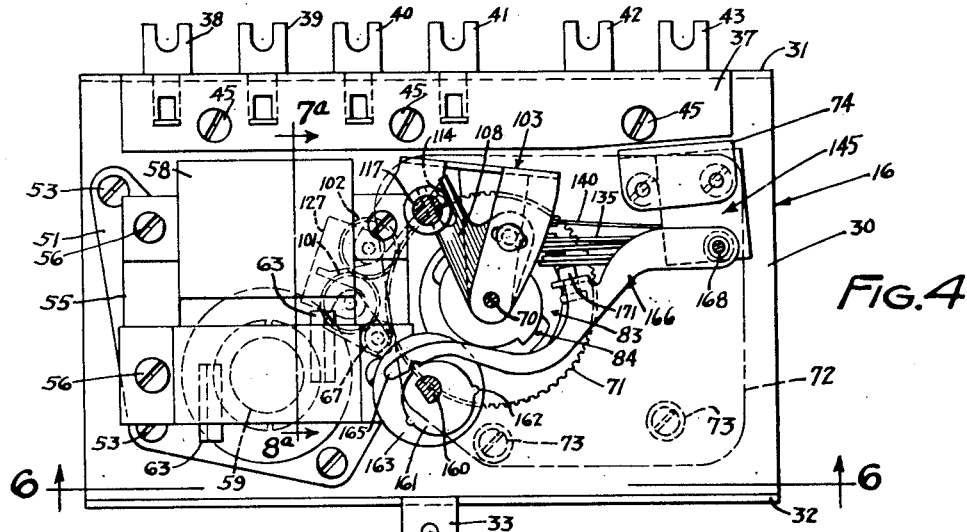

April 11, 1950 S. CRUM 2,504,002
STOKER TIMER
Filed Sept. 27, 1943 5 Sheets-Sheet 4

INVENTOR
STEPHEN CRUM
BY George H. Fisher
ATTORNEY

April 11, 1950     S. CRUM     2,504,002
STOKER TIMER
Filed Sept. 27, 1943     5 Sheets-Sheet 5
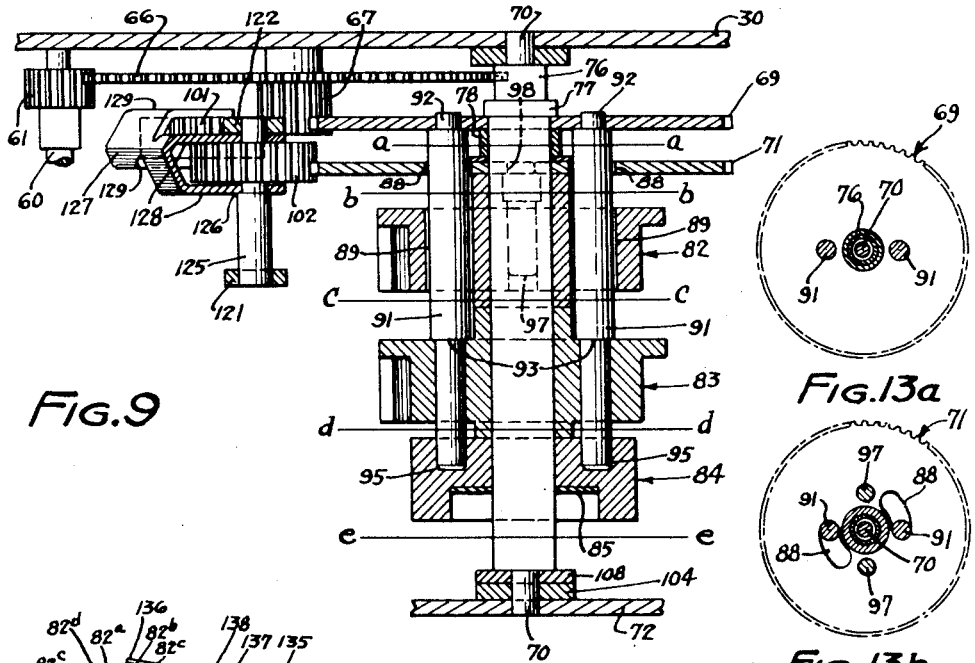
Fig. 9
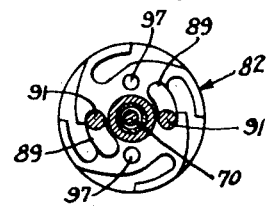
Fig. 13a
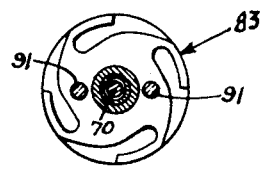
Fig. 13b
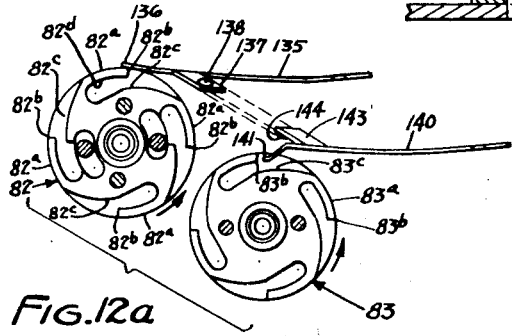
Fig. 12a
Fig. 13c
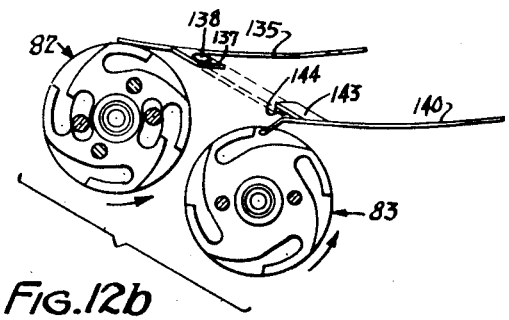
Fig. 12b
Fig. 13d
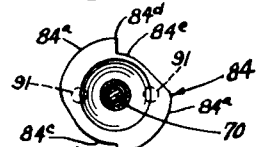
Fig. 13e
INVENTOR
STEPHEN CRUM
BY George N. Fisher
ATTORNEY Patented Apr. 11, 1950

2,504,002

UNITED STATES PATENT OFFICE 2,504,002

STOKER TIMER

Stephen Crum, Minneapolis, Minn., assignor to Minneapolis-Honeywell Regulator Company, Minneapolis, Minn., a corporation of Delaware Application September 27, 1943, Serial No. 503,969

16 Claims. (Cl. 200—33)

This invention relates to stoker control systems and to unitary control apparatus used in such systems. The installation of the controls for stoker systems is usually made at or adjacent to the furnace or boiler in which the stoker is used and under most conditions installation is dirty or dusty environment in which deterioration of openly mounted control apparatus occurs rapidly.

It is an object of the invention to provide improved stoker control systems and to provide improved unitary stoker control apparatus of the dirt and dust-proof type. More particularly, it is an object of the invention to provide stoker control apparatus wherein the control elements are sealed against the accumulation of dirt and dust and portions of the control apparatus double-sealed against the entrance of such foreign matter.

It is a further object of the invention to provide an improved control apparatus for maintaining stoker combustion during off periods in which apparatus the time period of combustion maintenance operation and the frequency of such operation may be varied without dismantling the apparatus for making desired adjustments and without the use of constantly rotating shafts projecting through the casings.

It is a further object of the invention to provide a combined control system wherein stoker maintained operation is carried out automatically and provision is made for optional starting and testing operation under manual control.

Other and further objects are those inherent in the apparatus illustrated, described and claimed.

The invention is illustrated in the drawings in which:

Figure 1 is a wiring diagram of one form of the invention illustrating the circuits and control casings schematically;

Figure 4 is front elevational view of the fire mantaining control with the cover removed and taken along the line 4—4 of Figure 5;

Figure 5 is a top view of the fire maintaining control, the cover being sectioned along the line 5—5 of Figure 2;

Figure 6 is a bottom view of the fire maintaining control with the cover removed, and taken along the lines 6—6 of Figure 4;

Figure 7A:
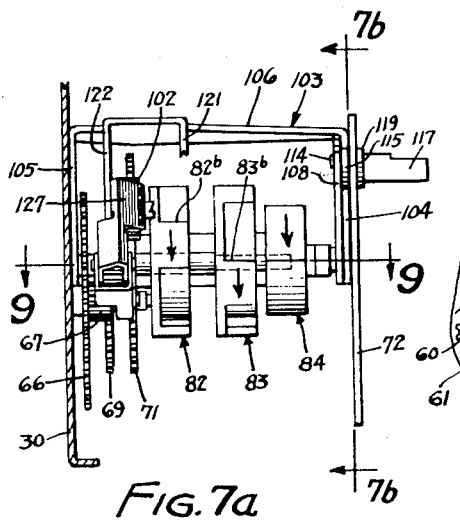
Figure 7a is a fragmentary side elevational view, partly in section of a portion of the fire maintaining control mechanism taken along the lines 7a—8a of Figure 4 showing the mechanism in one condition of operation.
Figure 7B:
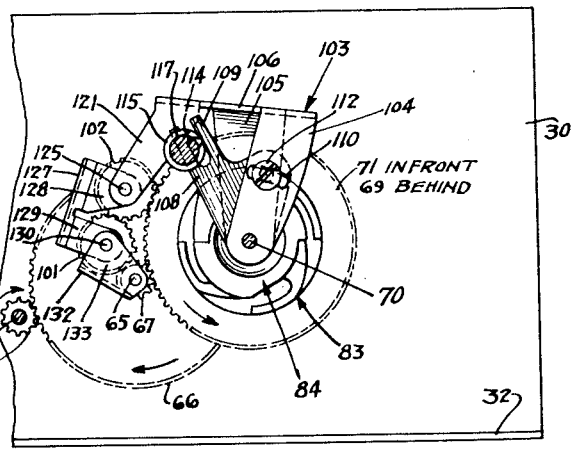
Figure 8A:
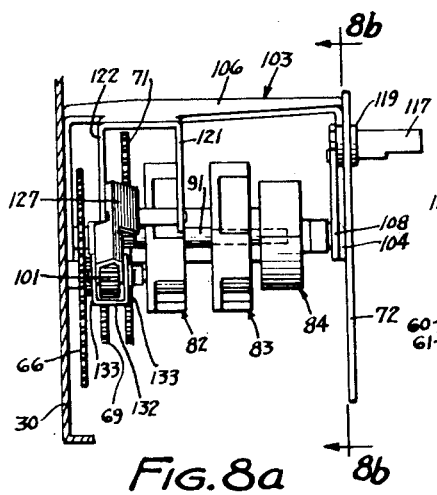
Figure 8B:
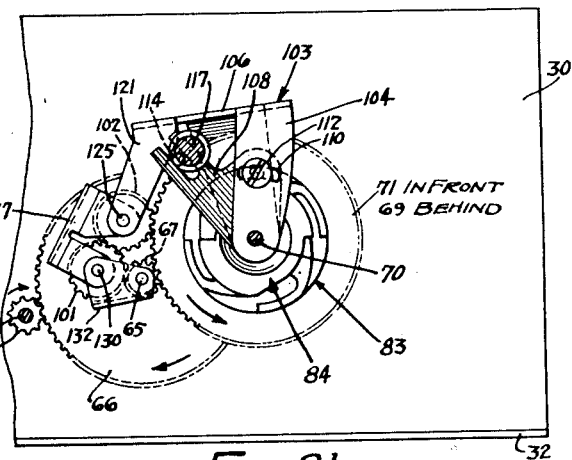

Figure 7b corresponds to Figure 7a and is a fragmentary front view partly in section with certain of the parts removed and taken along the lines 7b—7b of Figure 7a;

Figure 8a corresponds to Figure 7a excepting that it shows the apparatus in a different condition of operation, this figure likewise being along the line 7a—8a of Figure 4;

Figure 8b is a fragmentary front sectional view corresponding to Figure 8a and taken along the lines 8b—8b of Figure 8a, and showing the condition of operation of Figure 8a.

Figure 10:
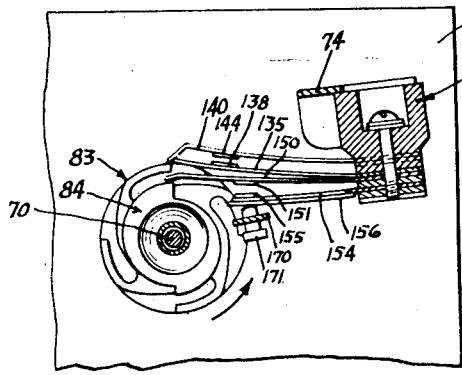
Figure 11:
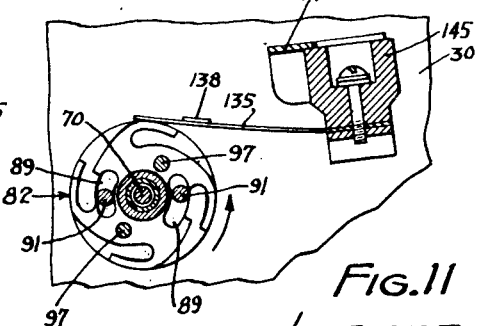

Figure 9 is an enlarged fragmentary sectional view taken along the lines 9—9 of Figure 7a, or at a similar level in Figure 8a;

Figure 10 is a fragmentary sectional view taken along the line 10—10 of Figure 6 illustrating cams and cam-operated switches of the fire maintaining control;

Figure 11 is a similar fragmentary sectional view taken along the line 11—11 of Figure 6;

Figure 12a and Figure 12b are schematic views illustrating the cams and cam-operated switches of the fire maintaining control apparatus, under two conditions of operation;

Figures 13a, 13b, 13c, 13d, and 13e are sectional views taken at the sectional lines a—a, b—b, c—c, d—d and e—e of Figure 9; and Figures 14a, 14b and 14c are fragmentary front elevational views of a portion of the fire maintaining control apparatus cam switching arrangements illustrating such elements in three conditions of operation respectively in each of the three figures; and Figures 15 and 16 are wiring diagrams of modified forms of control apparatus embodying the invention.

Throughout the drawings, corresponding designations refer to corresponding elements.

Figure 2:
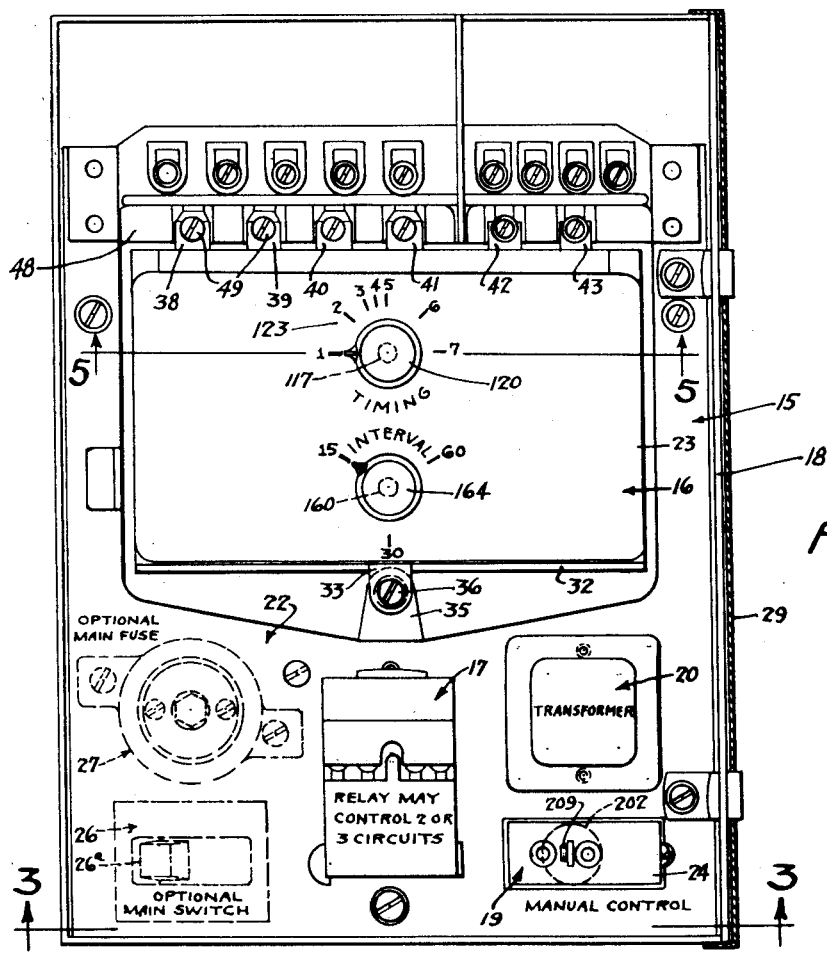
Figure 2 is an opened front elevational view of the dust-proof control apparatus, showing the front cover opened.
Figure 3:
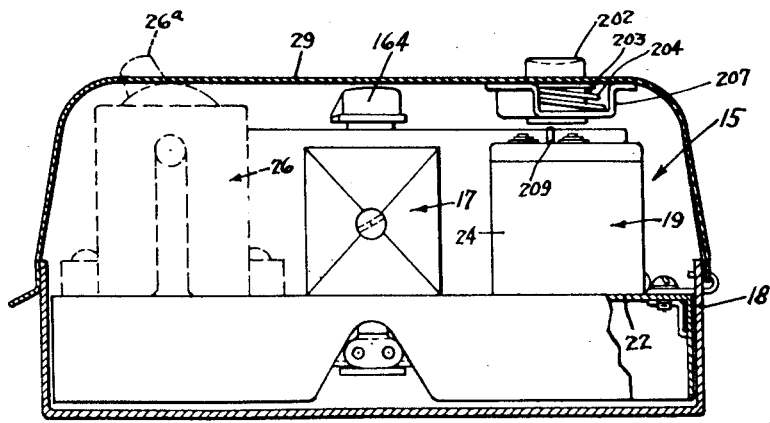
Figure 3 is a sectional view of such apparatus along the line 3—3, with the cover of the control apparatus casing closed.

Referring to Figure 1, there is illustrated the wiring diagram of a stoker control system wherein stoker mechanism, illustrated in the enclosure 2, is provided with a fuel feed motor, generally designated 5, and a separate blower motor, generally designated 6. These elements of the system constitute part of the stoker 2, and it is the purpose of the system to provide for the controlled operation of the fuel feed motor 5 or both the fuel feed and blower motors 5 and 6 to maintain a sufficient quantity of fuel so as to afford a constancy of combustion, i. e. to prevent the fire from going out, and to afford optional manual control for starting and testing. Positioned in the space, to which heat is supplied by the stoker 2, there is illustrated a thermally responsive control, shown in the enclosure 10, comprising a usual bi-metallic or other thermally responsive element 11, mounted at 12 and provided with contacts 13 and 14. Adjacent the stoker, there is provided a control apparatus, generally designated 15. The control apparatus 15 is shown in Figure 2 and 3. The control apparatus 15 includes a fire maintaining control, generally designated 16, described in detail hereinafter, a relay generally designated 17, a manually operated control, generally designated 19, and a transformer generally designated 20. Inasmuch as these mechanisms may include small and nicely machined operating parts, desirable operation requires a degree of cleanliness not uniformly available at or near stokers.

In order to afford the requisite cleanliness for the fire maintaining mechanism 16, relay 17, manually operated control 19 and transformer 20, these are all enclosed in a control apparatus casing 18, which is constructed with a close fitting door so as to be resistant to the entrance of dust thereinto. The casing 18, however, must be constructed so as to be opened occasionally by the operator and while it is resistant to the entrance of dust and therefor maintains the various controls relatively clean, they are not sufficiently clean for maximum life and under all conditions of installation. Accordingly, the fire maintaining control mechanism 16 and the manual control 19, are enclosed in individual dust-proof casings 23 and 24 respectively, these casings being themselves mounted within the dust-resistant control apparatus casing 18.

As the transformer 20 has no moving parts, and ventilation is desirable, no additional housing is provided. The relay 17 may, if desired, be provided with a molded or stamped housing but under most operating conditions, it has been found that sufficient cleanliness is afforded by the dust-resistant casing 18. Within the casing 18, there may be provided an optional manually operated main circuit switch 26 and an optional main fuse 27, as illustrated in dotted lines. When the switch 26 is provided, the swinging cover 29 of the casing 18 is apertured to permit the switch knob or button 26a to protrude therethrough as shown in Figure 3.

The fire maintaining control is illustrated in detail in Figures 4, 5, 6, 7a, 7b, 8a, 8b, 9, 10, 11, 12a and 12b, 13a through 13e and 14a through 14c.

Referring to Figures 4, 5 and 6, the fire maintaining control mechanism has a base panel 30 having a rearwardly extending top flange 31 and a forwardly extending bottom flange 32. The forwardly extending flange 32 is provided with a downturned lip 33 which is apertured at 34 to receive a holding screw, illustrated at 36 in Figure 2. Adjacent the top flange 31, there are provided spaced insulated blocks 37 between which are clamped a plurality of contacts 38, 39, 40, 41, 42 and 43, the insulating blocks being fastened tightly to the base panel 30 by means of screws 45. The contacts 38—43 are arranged to fit into mating contacts arranged in a bank on the molded insulating block 48 of Figure 2, and when fastened by means of screws 49, the contacts serve not only to make electrical connection from the various contacts of the insulating block 48 but also to the fire maintaining control casing and physically support it at its upper edge. The lower edge 32 of the base panel is fastened in place by means of a screw 36 which clamps the lip 33 against protuberance 35 in the interior framing 22 of the casing 18.

On the panel 30, there is mounted a small alternating current motor, shown opposite the bracket 50 in Figure 6. The motor comprises an end plate 51, which is mounted in spaced relationship with respect to the base panel 30 by means of three spacing studs 52, which are preferably riveted to the base panel and threaded so as to receive the end plate mounting screws 53. The motor includes a pile of field laminations 55, which are mounted in spaced relationship in respect to the end plate by means of fastening screws 56, which pass through the pile of laminations, three spacers 57 and into the end plate 51. The laminations may thus be pulled down tightly against the spacers 57 by means of the screws 56. The laminations are magnetized by means of a coil 58, which is wound so as to be suitable for any appropriate alternating current voltage and frequency. The laminations are formed with a circular orifice at 59 so as to receive a stationary housing containing the rotor of the motor together with suitable gearing which drives the shaft 60 upon which the pinion 61 is mounted. The field laminations 55 constitute a bi-polar field and the faces are provided with appropriate shading coils 63—63 of copper or other suitable material having a high electrical conductivity. By means of the motor 50, there is provided a constantly rotating slow speed drive which, in the apparatus illustrated, is one revolution per minute at pinion 61.

Upon the panel 30, there is provided a stub shaft 65 upon which there is journaled a large intermediate gear 66 which meshes with the pinion 61 of the drive motor. Gear 66 is provided with a concentric pinion 67, which is in mesh with a first cam drive gear 69 (see Figures 6 and 9), the latter being rotatably mounted upon shaft 70 extending from the panel 30 to the front panel 72. The front panel 72 is illustrated in dotted lines in Figure 4 and in full lines in Figure 6, and is supported by appropriate studs 73 and an intermediate frame 74. Upon the shaft 70, there is also concentrically mounted another cam drive gear 71 which is spaced from gear 69.

Referring to Figure 9 and Figures 13a through 13e, it will be observed that the shaft 70 carries a hollow spindle 76 having a flange at 77 against which the gear 69 is pressed. Between the gear 69 and gear 71, there is provided a spacing collar 78 and optional washer, and adjacent the gear 71 there are placed three cams 82, 83 and 84 in succession, each cam being a separate piece and made of molded or cut insulating material. All of the cams are retained in place by means of a pressed-on washer 85, but sufficient clearance is allowed so as to permit easy rotation of the cams. Gears 71 and cam 82 are provided with arcuate slots 88 and 89 respectively, through which extend a pair of diametrically arranged pins 91, which are attached to the gear 69 by riveting or pressing as indicated at 92. Pins 91 are of reduced diameter at their outer ends and receive the cam 83, which is pressed against the shoulder 93. The extending ends of the pins 91 pass through the cam 83 and into appropriately positioned holes 95 of the cam 84. Thus, when gear 69 rotates, it serves to carry the cams 83 and 84 due to the solid support afforded by pins 91—91. Gear 69, cam 83, and cam 84 constantly maintain the relationship illustrated in Figures 13a, 13d and 13e.

Gear 71 is likewise provided with diametrically arranged pins 97, the reduced ends of which are pressed and riveted onto gear 71 as illustrated at 98. The extending end of the pins 97 serves to carry the cam 82 which is maintained in fixed rotary relationship in respect to gear 71 as illustrated in Figures 9, 13b and 13c. It will be observed, however, that due to the arcuate slots 88 (in gear 71) and slots 89 (in cam 82), it is possible for the gear 71 and its cam 82 to be rotated as a unit with respect to gear 69 and its cams 83 and 84. In this manner, switch contacts which are controlled respectively by cams 82 and 83 may be caused to operate at various times with respect to each other. Gears 69 and 71 are driven at the same speed of rotation, but may be manually adjusted so as to vary the position of gear 69 with respect to gear 71.

As indicated above, the drive for gear 69 is from motor pinion 61 through intermediate gear 66 and pinion 67 directly to gear 69. The drive to gear 71 is from motor pinion 61 through intermediate gear 66 and intermediate pinion 67 to an idler gear 101, which overlaps the pinion 67 sufficiently to be driven thereby. The idler gear 101 overlaps and meshes with the second idler gear 102, which meshes with gear 71 and drives the latter. Gears 101 and 102 are of the same size and hence gear 71 rotates at the same speed as gear 69. The adjustment of the instantaneous position of gear 71 with respect to gear 69 is illustrated in Figures 7a and 7b, which show one position of adjustment of the gears and cams, and Figures 8a and 8b which show another position of adjustment.

On the shaft 70, there is mounted a stirrup, generally designated 103, having fore and aft legs 104 and 105 respectively, which are connected together by a plate 106. The fore and aft legs 104 and 105 respectively, extend from shaft 70, in a generally radial direction outward and beyond gears 69 and 71 and the connecting plate 106 reaches over the gears 69 and 71 and cams 82, 83 and 84. The whole stirrup 103 is movable pivotally around shaft 70 as a center. Flat against the inside of fore leg 104, there is an adjustment arm 108 and like the fore leg 104, the arm 108 is pivoted on shaft 70. The fore leg 104 has an arcuate slot 110 through which a screw 112 extends and is threaded into adjustment arm 108 so that the angular position of the arm may be varied slightly with respect to the fore leg 104 by loosening the screw 112 and moving the arm 108 arcuately.

The adjustment arm 108 has a bifurcated end 109 which lies close to the front panel 72 in such a position as to receive an eccentric pin 114. The eccentric pin 114 is mounted on the disc end 115 of the shaft 117, which extends through the front panel 72, the shaft being provided with a pressed-on collar 119 as shown in Figures 5, 7a and 8a. The shaft 117 extends in dust-tight relationship through dust-proof casing 23, and at its outer end is provided with an adjustment knob 120 by which the shaft 117 and hence the eccentric pin 114 may be rotated. The rotation of shaft 117 causes the eccentric pin to move with a circular motion and thus moves the bifurcated end 109 of arm 108. Since arm 108 is attached to the foreleg 104, this tends to move the entire stirrup 103 pivotally around the shaft 70.

From the plate 106 of the stirrup, there are a pair of downwardly extending arms 121 and 122, best illustrated in Figures 7a and 8a, which carry the pivot pin 125 on which the gear 102 is pivotally mounted. The pivot pin 125 also receives one end of a toggle link 127, which has downwardly extending end flanges 128. Referring to Figure 9, it will be noted that the pivot pin 125 has a reduced diameter at the end on which the gear 102 is mounted and the shoulder 126 serves to hold the side flanges 128 with the gear 102 between them in proper relationship against arm 122. This serves to maintain alignment between the gear 102 and the gear 71 and to maintain alignment between gears 102 and 101 (see Figures 7b and 9).

The toggle link 127 has another pair of downward flanges 129—129, which are off-set in respect to flanges 128 as shown in Figure 9. Between the flanges 129, there is positioned the idler gear 101, mounted for rotation upon a pivot pin 130. The pivot pin 130 also receives another toggle link 132 having downwardly extending flanges 133—133, which embraces flanges 129—129 at pivot 130. The opposite end of toggle 130 is pivoted upon the gear shaft 65. It will thus be observed that the links 127 and 132 constitute a toggle in which the pivot pin 130 is the middle or hinge joint and pivot shafts 125 and 65 are the end pivots of the toggle. The shaft 65 is stationary in respect to the framework, but the pivot shaft 125 is movable in an arcuate path about shaft 70 as a center, since it is carried by arm 121 on stirrup 103. When the shaft 117 is in the position shown in 7b, the toggle composed of links 127 and 132 is in its most extended position and consequently gear 71 is in an advanced instantaneous position in respect to gear 69. As the shaft 117 is rotated in either direction so as to bring the mechanism to the position shown in Figure 8b, the toggle composed of links 127 and 132 is in its most bent condition and gear 71 is in its least advanced instantaneous position with respect to the gear 69. Since the gear 71 carries cam 82, it will be appreciated that by rotating the knob 120 and consequently shaft 117 to the position shown in Figure 7b, the cam 82 is advanced with respect to cams 83 and 84 which are carried by the gear 69. Any intermediate adjustment between that shown in Figures 7b and 8b may be affected by appropriate positioning of the control knob 120. Shaft 117 does not rotate except when moved manually and hence there is no complicated rotary shaft connection to be maintained dust-proof between the shaft 117 and casing 23. Thus, a simple gasket or merely a tight-fitting joint between the shaft 117 and casing 23 is sufficient to render the casing dust-tight at this point.

The rotation of knob 120 with consequent adjustment of the instantaneous position of gear 71 with respect to gear 69 may be accomplished while the gears are being rotated under the influence of pinion 61. The normal rotation of the various gears are as indicated by arrows applied thereto as shown in Figures 7b and 8b.

Referring to Figures 10, 11, 12a, 13c and 13d, it will be observed that the cams 82 and 83 rotate counterclockwise as illustrated in these figures, and so far as the shape of the cam surfaces of these elements are concerned, they are identical. Hence, only one of the cams need be described. Thus referring to cam 82, Figure 12a, it will be observed that there are four areas, 82a of maximum diameter presenting four trailing edges 82b. There are also four areas 82c of minimum diameter immediately adjacent the trailing edges, each of these being sloped outwardly to the succeeding area 82a.

The areas of maximum diameter 82a are undercut, as illustrated at 82d, so as to afford a space into which the cam rider may move in the event of slight backward rotation of the cam, which may occur during the adjustment of one cam in respect to another. Thus, it will be observed that since cam 83 is driven by gear 69 through the gear train 67—77 from pinion 61, the position of cam 83 is not adjustable, and variations in timing are afforded by relative movements of cam 82 as explained above. If it is assumed that cams 82 and 83 are at the position shown in Figure 8a and that the cam fingers 135 and 140, hereinafter referred to, have just dropped off of the trailing edges of each cam, should adjustment then be made so as to bring the mechanism to the position of Figure 7a, this would in effect afford a backward rotation of cam 82, in which the trailing edge 82b of cam 82 is less advanced than the trailing edge 83b of cam 83. Hence space 82d is afforded for the cam finger 135 to be received when such an adjustment is made. Cam 83 is made like cam 82 for convenience in manufacture in mass production.

Referring to Figures 12a and 12b particularly, and also to Figures 4, 5 and 6, it will be observed that there is a cam finger 135 having a tip 136 which rests upon the surface of cam 82, the cam finger 135 being provided with a sidewardly extending lobe 137 carrying a contact 138 on its upper surface. Similarly, cam finger 140 has a tip 141 which rests upon the surface of cam 83 and has a sidewardly extending lobe 143 carrying a contact 144 on its under surface. The cam fingers 135 and 140 are mounted upon an insulation block, generally designated 145 (Figure 4) the latter in turn being carried by frame member 74. The cam fingers 135 and 140 are positioned and tensioned so as to cause tips 136 and 141 to bear continuously upon the cam surfaces of cams 82 and 83 respectively. During rotation of the two cams, the trailing edge 83b of cam 83 is advanced, in more or less degree, in respect to edge 82b of cam 82, and this permits finger 140 to drop first, until the contact 144 of finger 140 is in engagement with the contact 138 of finger 135, the latter in the meantime being maintained elevated due to the fact that its tip 136 is still upon the high part 82a of the cam 82. This condition is maintained until tip 136 of finger 135 drops to the low part 82c of cam 82. When this occurs, both fingers 135 and 140 spring downward until their tips are on their respective cams and in so doing the contacts are in normally separated condition. The open circuit condition is thus maintained as both the tips 141 and 136 are gradually elevated by the upward curvature of the cam surfaces 83c and 82c and also while the tips continue to the most elevated cam surfaces 83a and 82a respectively. The next closure is initiated when the tip 141 drops off at the next trailing edge 83b prior to the similar dropping off of tip 136 from the trailing edge 82a of its cam.

The cam 82 and 83 are arranged to rotate at a steady speed, preferably once per hour and thus a circuit closure is accomplished four times per hour due to the four cam surfaces upon cams 82 and 83. Any other time frequency of closure may obviously be obtained by rotating cams 82 and 83 at appropriate speeds or by providing a larger or smaller number of breaks in the cam surfaces. Furthermore, by rotating the knob 120, shaft 117 is likewise rotated and the position of the cams 82 and 83 with respect to each other may also be varied. In this manner, the time period during which the circuit closures are maintained may be adjusted at will.

Cam 84 is carried upon pins 91—91 from gear 69 (Figure 9), and as shown in Figure 13e, cam 84 is provided with two surfaces of maximum and equal elevation 84a; a trailing edge 84b which drops off to a surface of intermediate depth 84c, and a trailing edge 84d which drops off to a surface of maximum depth 84e. The cam 84 and its associated contacts and the contact adjustment mechanism are shown in three conditions of operation in Figures 14a, 14b and 14c. Adjacent to cam 84, there are arranged a pair of overlying contact arms 150 and 154. Contact arm 150 carries a contact 151 on its underside and contact arm 154 which carries a contact 155 in its upper surface in a position to engage contact 151. The underside of the contact arm 154 is provided with an insulating strip 156 (Figures 4 and 6, and the two contact arms 150 and 154 are carried and held in properly spaced relationship by the insulating block 145. The outer end of the contact arm 150 has a tip 152 in line with cam 84. As shown in Figures 4 and 6, the front panel 72 of the frame is provided with a rotating shaft 160 having on its inner surface a circular eccentrically mounted cam 161 having three tips 162. A circular concentric retaining flange 163 is positioned against cam 161 and serves to maintain the outer end 165 of a rocker arm 166 in place upon cam 161. The rocker arm 166 is pivoted to the front panel 72 by means of pin 168 and lies against the inside of the front panel 72. By rotating the shaft 160 into its three positions shown respectively in Figures 14a, 14b and 14c, the elevation of the outer end 165 of the arm 166 may be varied.

The arm 166 carries an intermediate bifurcated side arm 170, shown in Figures 5 and 14a through 14c. An adjustment screw 171 is threaded through the bifurcated end sidearm 170 and is adjusted so as to bring the screw tip into position to bear against the insulating strip 156. The contact arm 154 is of springy conducting material and always tends to assume a straight position and thus maintains abutment against adjustment screw 171. Hence as the stub-shaft 160 is rotated, the position of the contact arm 154 and its contact 155 may be moved to the high position shown in Figure 14a, to the low position shown in Figure 14b and to an intermediate position shown in Figure 14c. The purposes of these three adjustments are as follows:

When the contact arm 154 is in the high position shown in Figure 14a, contact 155 engages contact 151 and holds contact arm 150 and the tip 152 in a position such that the tip 152 is entirely off of cam 84. Hence, as cam 84 rotates, the contact 151 is never moved away from contact 155, and the circuit between contacts 151 and 155 is never broken.

When the contact arm 154 and contact 155 are held in the low position shown in Figure 14b, the contact 155 positions the contact 151 and contact arm 150 so that tip 152 is in the position shown in full lines in Figure 14b, viz.: the tip 152 is slightly elevated above the lowest cam surface 84e, but is below the depth of the intermediate cam surface 84c. Assuming such an adjustment, when the tip 152 is on the high part 84a of cam 84, just before the trailing edge 84d reaches the tip 152, contact 151 is then separated from contact 155. Then as the cam 84 rotates and the drop-off 84d is reached, the tip 152 will move downwardly under the influence of its inherent springy action and will bring contact 151 into contact with contact 155 thus completing the circuit. The circuit is maintained until the tip 152 is elevated by the approach of the next high portion 84a of the cam, and then the circuit is opened. As the cam continues to rotate, the tip 152 drops down off of the trailing edge 84b onto the portion of intermediate depth 84c, but this drop is not sufficient to bring the contact 151 into engagement with contact 155, because the latter contact is maintained at a level such that the tip 152 must drop below the level of surface 84c before contact engagement is completed. Hence with the shaft 160 and cam 161 in the position shown in Figure 14b, the contacts 151—155 are closed and the circuit is completed only once for each revolution of the shaft of the cam.

When the shaft 160 and the cam 161 are in the intermediate position shown in Figure 14c, the contact strip 154 is elevated to a position such that the dropping off of the tip 152 both towards the intermediate level 84c and towards the deepest level 84e of the cam will, in each instance, lower the contact 151 sufficiently to bring it into engagement with contact 155. Thus, as the cam 84 is rotated two circuit closures will be accomplished for each revolution of the cam. With such adjustment, the tip 152 never reaches either level 84c or 84e because as strip 150 moves downward contact 151 rests on contact 155 and the movement is arrested short of the place where tip 152 would engage the cam surface. The tip 152, of course, subsequently is re-engaged with the cam as the upward slopes of surfaces 84c and 84e are reached as the cam rotates.

The shaft 160 projects through the dust-tight housing 23 in a dust-tight manner similar to that illustrated for shaft 117 in Figure 5, and accordingly all adjustments of the fire maintaining control mechanism 16 may be accomplished from the exterior thereof and there are no constantly rotating shafts projecting from the housing with resultant wear and looseness which would permit the entrance of dust into the housing.

Referring to the wire diagram, Figure 1, the switch contacts 151 and 155 are arranged in series with the contacts 144 and 138 and are preferably brought out of the fire maintaining control mechanism housing 16 at terminals 40 and 41, Figure 4. The power supply for operating the motor 50 is supplied at terminals 38 and 39. Contacts 42 and 43 are blank contacts and are not utilized in the apparatus herein illustrated and described other than to serve as a mechanical support for the fire maintaining mechanism 16.

In the wiring diagram, alternating current power is supplied at alternating current supply lines 3 and 4 and flows through the optional switch 26 and optional fuse 27 into the control apparatus 15. The primary 178 of the transformer 20 is energized through a circuit beginning at line 176 through line 177 to the primary 178 and thence through line 179 to supply line 4. The secondary 180 of the transformer is connected by line 181 to the one terminal of the coil 183 of relay 17. The other terminal of the coil 183 is connected by line 184 to junction 185 from which a circuit extends over line 186 to contact 188 of thermostat 10. From junction 185, a self-holding circuit for the relay extends through line 190 and relay contacts 191 and 192 through line 194 to terminal 12 of the thermally operated switch 10.

The manually operated control 19 comprises a suitably mounted first contact blade 195 and a second contact blade 197 which is inherently biased away from the blade 195. These two contact blades 195 and 197 carry contacts 196 and 198 respectively. The contacts are arranged to be latched into engaged position against the bias of blade 197 by thermal member 200, which may conveniently be a bi-metallic strip or expansible wafer. When the thermal element 200 is in the cold position as shown, the upper end 201 thereof tends to assume a position beneath the contact blade 197 and in the event the contact blade 197 has been lifted so as to bring contacts 198 and 196 into engagement, the tip 201 of the thermal member 200 will maintain the blade 197 in contact making position. When the thermal member 200 is heated to a pre-determined degree, the upper end 201 thereof will be moved to the left as shown in Figure 1, from a position beneath the contact blade 197, thus permitting the contacts 196 and 198 to separate. A trip-free resetter is indicated at 205 and comprises insulated fingers 206 and 208 which are vertically movable by means of member 209, the latter being positioned in housing 16 to be engaged by push button 202. Referring to Figure 3, it will be noted that button 202 extends through a hole in the cover of housing 18 and is steadied on the inside by movement through an aligned hole in brace 207. Spring 204 rests against brace 207 and bears against flange 203 on the button 202, thus normally forcing it outward. Button 202 is aligned with the reset member 208 of the manual control 19, so that when 202 is pushed inwardly in respect to the cover of housing 18, the member 209 moves (in the upward direction) as illustrated in Figure 1.

When the thermal element 200 moves from beneath the blade 197, the blade will spring downwardly and engage the insulated finger 208 and the other blade 195 will engage the insulated finger 206. The fingers 206 and 208 maintain the blades 195 and 197 in spaced relationship thus separating the contacts 196 and 198. A heater 210 is located adjacent the thermal element 200, and is connected in series with the circuit control by contacts 196—198. Thus a circuit extends over line 212 to blade 195, thence through blade 195, contacts 196 and 198, through blade 197 and line 213 to heater 210, thence over line 214 to terminal 216 of the secondary 180 of transformer 20.

The thermal element 11 of the temperature responsive control 10 is provided with a movable contact 13, which engages stationary contact 188 somewhat after movable contact 14 has engaged stationary contact 218 on temperature fall. The latter contact 218 is connected by line 219 to junction 216 of the secondary of the transformer. Thus, when the thermal element 11 of the temperature responsive control 10 cools, contact 14 is first brought into engagement with contact 218 and thereafter, upon further cooling, contact 13 engages contact 188. A circuit is then established from terminal 220 of the secondary 180 of transformer 20 through line 181 to the relay coil 183, thence through line 184 to junction 185. The circuit then continues by way of line 186 to contact 188, movable contacts 13 and 14 to stationary contact 218 and thence over line 219 to junction 216, which is the second terminal of the transformer secondary 180.

The relay coil 183 is accordingly energized and closes contact 192 whereupon a self-holding circuit is established from junction 185 through line 190 through the closed contacts 191 and 192, and line 194 to terminal 12 of the thermally responsive element, thence through the thermal strip 11, contacts 14 and 219, line 219 to terminal 216 of the transformer secondary 180. This circuit is maintained until heating contact 14 moves away from contact 218. It may be noted that contact 13 breaks from contact 188 at a lower temperature than that at which contact 14 breaks from contact 218.

Arbitrary operation of relay 17 under manual control may be accomplished when the thermally responsive element 11 is in the open circuit condition, by pushing button 202. This moves element 205 (Figure 1) in the direction of blades 195 and 197. This movement maintains the blades in open circuiting condition while they are being raised sufficiently for the then cool thermal element 200 to move under influence of its self-elasticity to the position shown in Figure 1 whereupon the element 205 is moved away from the blades 195—197 and as blade 197 then rests upon the tip 201 of the thermal element 200, its contact 198 is in a position to be engaged by contact 196 of strip 195 which springs toward blade 197 when the element 205 is allowed to retract. A circuit is thus established from junction 185 of the relay 17 through line 212, blade 195, contact 196, contact 198, blade 197 through line 213, heater coil 210 and line 214 to junction 216 of the transformer secondary 180. This arbitrary operation under manual control causes the energization of relay 17. If during such time the thermally responsive element 11 is in the warm condition such that contact 14 is out of engagement with stationary contact 218, the self-holding circuit through relay contacts 191 and 192, previously described, is not completed, but the relay will remain energized until such time as the heater element 210 causes the thermal element 200 to bow to the left, as shown in Figure 1, whereupon the contact blade 197 is released and springs away from the blade 195 thus breaking the relay circuit.

The work circuits controlled by the relay 17 include contacts 225—226 and 235—236. When contacts 225 and 226 close, a circuit is established from line 176 through line 227 and the then closed contacts 225—226 and line 228 to junction 229, thence over line 230 to one terminal of the blower motor 6 and from the other terminal of the blower motor through line 231 to power supply line 4. The blower motor is accordingly operated. At the same time, a circuit is completed from line 176 through line 237, through the then closed contacts 235 and 236, and through line 238 to junction 239, thence over line 240 to junction 241 and line 242 to one terminal of the fuel feed motor 5, and then continuing from the other terminal of the fuel feed motor over line 243 to the alternating current supply line 4.

Accordingly, when the relay 17 is operated, the fuel feed motor and blower motor are energized and this is true, regardless of whether the relay operation is initiated by the thermally responsive element 11 or established arbitrarily by manually operated control 19. This operation continues until such time as the thermally operated control 10 breaks the self-holding circuit of relay 17, or in the case of manual starting, the thermal member 200 moves to a position to allow contacts 196 and 198 to be separated.

In order to maintain the fire of a stoker, it is desirable to feed fuel periodically, but it is not necessary in all installations to provide for operation of the stoker blower during such times, since ordinary stack draft is usually sufficient for maintaining fire. Accordingly, during such fire maintaining periods, the fuel feed motor 5 may desirably be operated without simultaneously operating the blower motor 6. The cam operated switches 138—144 and 151—155 are connected in series and to the fuel feed motor in a circuit beginning at line 176 through line 245 to contact 144, thence through contact 138 to contact 151 and contact 155 through line 246 to junction 241, thence over line 242 to one terminal of the fuel feed motor, and from the other terminal of the fuel feed motor to line 243 and to the alternating current supply line 4. Motor 50 of the fire maintaining timer is energized constantly over a line extending from alternating current supply line 176, thence over line 248 to motor 50 and thence over line 250 to junction 252 and then line 179 to the alternating current supply 4. Accordingly, the motor 50 operates constantly and causes the periodic closure of contacts 138 and 144 a number of times each hour, the duration of the contact closure being variable at the will of the operator.

Thus, by turning knob 120 on shaft 117, the duration of contact closure between contacts 138 and 144 may be varied, for example, from one minute to seven minutes according to the scale 123, Figure 2. The frequency at which contact is established depends upon the rate of revolution of the cams 82 and 83, for example, one revolution per hour resulting in four contact closures per hour. When shaft 160 is rotated by means of knob 164 to the position shown in Figure 14a, contact 151 is maintained permanently in engagement with contact 155 and accordingly the fire maintaining timer 16 causes the circuit to be established to the fuel feed motor 5 exclusively under the control of contacts 138 and 144. Thus, in the chosen example, at the rate of four times per hour for time periods varying, from one to seven minutes. In this position, the knob 164 on shaft 160 is as shown in Figure 2 with the pointer of the knob toward "15" i. e., the fire maintaining operation takes place at 15 minute intervals.

By rotating the knob 164 (and hence shaft 160) to the position shown in Figure 14b, the switch contacts 151 and 155 are closed only when the tip 152 of blade 150 is on the portion 84e of the cam 84, viz: The contacts 151 and 155 are closed only once per hour. Accordingly, only one of the four closures per hour of contacts 138 and 144 are effective to establish a circuit to the fuel feed motor. Under this condition of operation, the pointer on knob 164 is opposite the 60 mark, viz.: the interval is sixty minutes.

When the knob 164 is rotated so as to bring shaft 160 into the position shown in Figure 14c, the blade 154 and contact 155 are elevated sufficiently that contact 151 is brought into engagement therewith, when the tip 152 of blade 150 drops into the intermediate shallow portion 84c of the cam as well as when the tip drops into the deep portion 84e of the cam, thus effecting two closures of contacts 151—155 per hour. Inasmuch as the trailing edges 84b and 84d are diametrically opposed and in the assumed example, cam 84 rotates once per hour, the engagements of contacts 151 and 155 occur at half-hour intervals. Therefore, two circuit closures of contacts 138 and 144 are effective, viz.: at half-hour intervals.

It will thus be observed that by the combination of periodically operating switches of the fire maintaining mechanism 16, it is possible to obtain establishment of a circuit at, for example, fifteen minute intervals or thirty minute intervals or sixty minute intervals and the duration of the fire maintaining period, viz.: during which the circuit is established, may be varied, for example, from a minimum of one minute to a maximum of seven minutes, and that such adjustments are accomplished without utilizing any constantly rotating shafts projecting from the interior mechanism of the fire maintaining control unit 16 to the exterior thereof.

If it is desired to operate the blower 6 upon each occasion that fuel is fed to the stoker by means of motor 5, relay contact 235 and 236 may be omitted (or not wired) and junctions 229 and 239 cross-connected as shown by the dotted line 244. So connected, the operation of the relay 17 or the operation of the fire maintaining mechanism 16 will cause simultaneous operation of the fuel feed motor or blower motor.

Such a mode of operation is accomplished by use of the circuit arrangement shown in Figure 15, wherein the fuel feed motor 5 is cross-connected by means of line 244. The blower motor 6 may be separate or if desired, a single motor 5 may be used for operating the fuel feed and also for operating the blower, the motor 6 in such case being dispensed with. In this instance, the relay 17 utilizes only contacts 191—192 and 225—226, the contacts 235—236 and wiring connected to them being not utilized. Otherwise, the circuit arrangements illustrated in Figure 15 are identical with those illustrated in Figure 1. The thermatic control element 10, manual control 19, transformer 20 and optional fuse 27 and switch 26 being as indicated in Figure 6.

In Figure 16, there is illustrated a modified form of the invention wherein the manually operated control 19, the fire maintaining control 16 and the motor contacts 225 and 226 of relay 17 are all connected in parallel to line 244a and closure of the circuit through any of these causes the operation of the motor 5 or motors 5 and 6 connected between lines 244a and alternating current supply line 4. In this modification, the operation of relay 17 is accomplished solely under the control of the thermatically operated controller 10 which, like that illustrated in Figure 1, serves to initiate a circuit through the coil 183 by simultaneous initial engagement of contact 13 with stationary contact 188 and of contact 14 with stationary contact 218. When this occurs, a circuit is established from the transformer secondary 180 through line 181, coil 183, lines 184 and 186 through the closed contacts 188—13 and 14—218 in series, and line 219 to the transformer secondary 180. The relay 17 operates and establishes a self-holding circuit through contacts 191 and 192 as previously explained with reference to Figure 1. The relay 17, when operated, serves also as in the modification shown in Figure 1, to establish a circuit through motor control contacts 225—226.

Many obvious variations will be apparent to those skilled in the art and such are intended to be within purview of the invention illustrated, described and claimed.

I claim as my invention:

1. A variable timing circuit closer for timing the operations of stokers and the like, comprising adjacent concentric first and second gears, a first pinion for driving the first gear, a gear train for driving the second gear, including said first pinion, an idler gear and a second pinion gear meshed successively together, said second pinion being in mesh with said second gear, a toggle frame for maintaining the gears of said gear train, the ends of said toggle being journaled concentrically with said first and second pinions and the hinge of said toggle being journaled concentrically with said idler gear, means for moving the second pinion in an arcuate path around the center of said first and second gears, and switch means operated by said first and second gears.

2. In a timer, in combination, a driving motor, a cam rotated thereby, said cam having at least two operating portions of different throws, one throw being greater than the other, a cam follower means, switch means to be actuated by said cam follower means, and adjusting mechanism associated with one of said means adjustable to positions in which said switch means is actuated by both of said throws of the cam or by only one of them.

3. In a timer, in combination, a driving motor, a cam rotated thereby, said cam having at least two operating portions of different throws, one throw being greater than the other, a cam follower means, switch means to be actuated by said cam follower means, adjusting mechanism associated with one of said means adjustable to positions in which said switch means is actuated by both of said throws of the cam or by only one of them, a dust-proof casing surrounding said timer, and means extending through said casing and operable from the outside thereof for operating said adjusting means.

4. In a timer, in combination, a switch, first and second rotatable switch operating members relatively rotatable to each other to vary the length of time said switch is maintained in one of its circuit controlling positions, a driving motor, a driving connection between said motor and the first of said rotatable switch operating members, a geared driving connection between said motor and the second of said switch operating members for driving it at the same speed as the first geared driving connection including a gear bodily movable while maintaining said driving connection, bodily movement of said gear causing rotation of said second switch operating member independent of the rotation caused by said driving motor whereby bodily movement of said gear results in relative rotation of said two switch operating members, means to bodily move said gear, a cam operated by said driving motor, said cam having at least two operating portions of different throws, one throw being greater than the other, a cam follower means, switch means to be actuated by said cam follower means, and adjusting mechanism associated with one of said means adjustable to positions in which said switch means is actuated by both of said throws of the cam or by only one of them.

5. In a timer, in combination, a switch, first and second rotatable switch operating members relatively rotatable to each other to vary the length of time said switch is maintained in one of its circuit controlling positions, a driving motor, a driving connection between said motor and the first of said rotatable switch operating members, a geared driving connection between said motor and the second of said switch operating members for driving it at the same speed as the first geared driving connection including a gear bodily movable while maintaining said driving connection, bodily movement of said gear causing rotation of said second switch operating member independent of the rotation caused by said driving motor whereby bodily movement of said gear results in relative rotation of said two switch operating members, means to bodily move said gear, a cam operated by said driving motor, said cam having at least two operating portions of different throws, one throw being greater than the other, a cam follower means, switch means to be actuated by said cam follower means, a dust-tight housing surrounding said timer, an operating member for said means to bodily move said gear extending through said housing, and a second operating member for said adjusting mechanism also extending through said housing.

6. In a timer, in combination, a switch, first and second rotatable switch operating members relatively rotatable to each other to vary the length of time said switch is maintained in one of its circuit controlling positions, a driving motor, a driving connection between said motor and the first of said rotatable switch operating members, a geared driving connection between said motor and the second of said switch operating members for driving it at the same speed as the first, said geared driving connection including a gear bodily movable while maintaining said driving connection, bodily movement of said gear causing rotation of said second switch operating member independent of the rotation caused by said driving motor whereby bodily movement of said gear results in relative rotation of said two switch operating members, and means to bodily move said gear.

7. In a timer, in combination, a switch, first and second rotatable switch operating members relatively rotatable to each other to vary the length of time said switch is maintained in one of its circuit controlling positions, a driving motor, a driving connection between said motor and the first of said rotatable switch operating members, a geared driving connection between said motor and the second of said switch operating members for driving it at the same speed as the first, said geared driving connection including a gear bodily movable while maintaining said driving connection, bodily movement of said gear causing rotation of said second switch operating member independent of the rotation caused by said driving motor whereby bodily movement of said gear results in relative rotation of said two switch operating members, a dust-proof casing surrounding said timer, an adjusting member extending through said casing, and connections between said adjusting member and bodily movable gear for bodily moving said gear from outside said casing.

8. In a cam operated mechanism, in combination, a switch, a pair of cams for controlling the movement of said switch in opposite directions to open and close the same, a driving means, a direct connection between said driving means and a first of said cams for continuously driving the same in a predetermined direction, an indirect connection between said driving means and the second of said cams for driving the same at the same speed in said predetermined direction, and a normally stationary adjusting means associated with said indirect connection for adjusting a portion thereof in a manner to cause said second cam to move relative to said first cam.

9. In a timer, in combination, a driving motor, a cam constantly rotated thereby in a single direction, said cam having at least two operating portions of different throws, one throw being greater than the other, a cam follower cooperable with the throws of said cam, a switch arranged for actuation by said cam follower, and means for adjusting the position of said switch in such manner that in one adjusted position the switch is actuated by said cam follower in cooperating with both of the throws of said cam and that in another adjusted position the switch is actuated by said cam follower in cooperating with only one of the throws of said cam.

10. In a timer, in combination, a driving motor, a cam continuously rotated thereby in a single direction, said cam having at least two operating portions of different throws, one throw being greater than the other, a cam follower cooperating with the throws of said cam, a first switch contact positioned by said cam follower, a second cooperating switch contact, and means for adjusting said second switch contact toward and away from the first switch contact in such manner and to such an extent that in one position of adjustment the cam follower and first switch contact in cooperating with both throws of said cam move sufficiently far to engage the second contact and in another position of adjustment the cam follower and first switch contact move sufficiently far to engage the second contact when the cam follower cooperates with only one of the two throws of said cam.

11. In a timer, in combination, a driving motor, a cam continuously rotated thereby in a single direction, said cam having a high portion, an adjacent low portion, then a second high portion and an adjacent intermediate portion, a cam follower cooperating with said portions of the cam, a first switch contact positioned by the cam follower, a second cooperating switch contact, and means for adjusting said second switch contact toward and away from the first switch contact in such manner and to such an extent that in one position of adjustment the cam follower in engaging both the low and intermediate portions of said cam moves said first contact sufficiently far to engage the second contact and in another position of adjustment the cam follower only in engaging the low portion of said cam moves the first contact sufficiently far to engage the second contact.

12. In a timer, in combination, a driving motor, a first cam continuously rotated thereby, said cam having at least two operating portions of different throws, one throw being greater than the other, a cam follower means, a first switch means to be actuated by said cam follower means, adjusting mechanism associated with one of said last-named means and adjustable to positions in which said switch means is actuated by both of said throws of the cam or by only one of them, second and third cams concurrently driven by said driving motor in the same direction and at the same speed, a second switch controlled by said second and third cams, said second and third cams being rotatable in respect to each other while being driven by said driving motor to vary the length of time said second switch is maintained in one of its circuit controlling positions, and adjusting means associated with at least one of said second and third cams for rotating said cams relative to each other while said cams are being driven by said driving motor.

13. In a timer, in combination, a driving motor, a cam rotated thereby, said cam having at least two operating portions of different throws, one throw being greater than the other, a cam follower means, switch means to be actuated by said cam follower means, and adjusting mechanism associated with one of said means adjustable to positions in which said switch means is actuated by at least one of said throws or by neither one of them.

14. In a timer, in combination, a driving motor, a cam rotated thereby, said cam having at least two operating portions of different throws, one throw being greater than the other, a cam follower means, switch means to be actuated by said cam follower means, and adjusting mechanism associated with one of said means adjustable to positions in which said switch means is actuated by both of said throws of the cam or by only one of them or by neither one of them.

15. In a timer, in combination, a switch, first and second rotatable switch operating members relatively rotatable to each other to vary the length of time said switch is maintained in one of its circuit controlling positions, a driving motor, a driving connection between said motor and the first of said rotatable switch operating members, a geared driving connection between said motor and the second of said switch operating members for driving it at the same speed as the first geared driving connection including a gear bodily movable while maintaining said driving connection, bodily movement of said gear causing rotation of said second switch operating member independent of the rotation caused by said driving motor whereby bodily movement of said gear results in relative rotation of said two switch operating members, means to bodily move said gear, a cam operated by said driving motor, said cam having at least two operating portions of different throws, one throw being greater than the other, a cam follower means, switch means to be actuated by said cam follower means, and adjusting mechanism associated with one of said means adjustable to positions in which said switch means is actuated by at least one of said throws or by neither one of them.

16. In a timer, in coumbination, a switch, first and second rotatable switch operating members relatively rotatable to each other to vary the length of time said switch is maintained in one of its circuit controlling positions, a driving motor, a driving connection between said motor and the first of said rotatable switch operating members, a geared driving connection between said motor and the second of said switch operating members for driving it at the same speed as the first geared driving connection including a gear bodily movable while maintaining said driving connection, bodily movement of said gear causing rotation of said second switch operating member independent of the rotation caused by said driving motor whereby bodily movement of said gear results in relative rotation of said two switch operating members, means to bodily move said gear, a cam operated by said driving motor, said cam having at least two operating portions of different throws, one throw being greater than the other, a cam follower means, switch means to be actuated by said cam follower means, and adjusting mechanism associated with one of said means adjustable to positions in which said switch means is actuated by both of said throws of the cam or by only one of them or by neither one of them.

STEPHEN CRUM.

REFERENCES CITED

The following references are of record in the file of this patent:

UNITED STATES PATENTS

| Number | Name | Date |
|---|---|---|
| 463,874 | Seymour | Nov. 24, 1891 |
| 771,699 | Blanchard | Oct. 4, 1904 |
| 1,210,559 | Story | Jan. 2, 1917 |
| 1,580,178 | Talbot | Apr. 13, 1926 |
| 1,611,063 | Peiler | Dec. 14, 1926 |
| 1,693,485 | Luckey | Nov. 27, 1928 |
| 1,708,022 | Lorenz | Apr. 9, 1929 |
| 1,745,975 | Bissell | Feb. 4, 1930 |
| 1,851,247 | Hall | Mar. 29, 1932 |
| 1,909,933 | Donley | May 23, 1933 |
| 1,965,761 | Bardes | July 10, 1934 |
| 1,997,798 | Kucera | Apr. 16, 1935 |
| 2,055,641 | Young | Sept. 29, 1936 |
| 2,128,413 | Hejduk | Aug. 20, 1938 |
| 2,234,375 | Kronmiller | Mar. 11, 1941 |
| 2,248,528 | Gordon et al. | July 8, 1941 |

FOREIGN PATENTS

| Number | Country | Date |
|---|---|---|
| 378,161 | Italy | Jan. 24, 1940 |